United States Patent
Hodge (10) Patent No.: US 6,244,804 B1
(45) Date of Patent: Jun. 12, 2001

(54) TENSION-INDICATING FASTENERS

(76) Inventor: Malcolm H. Hodge, 485 Mountain Rd., West Hartford, CT (US) 06117

(*) Notice: Subject to any disclaimer, the term of this patent is extended or adjusted under 35 U.S.C. 154(b) by 0 days.

(21) Appl. No.: 09/404,931

(22) Filed: Sep. 24, 1999

Related U.S. Application Data (60) Provisional application No. 60/101,890, filed on Sep. 25, 1998.

(51) Int. Cl.$^7$ ........................................ F16B 31/02
(52) U.S. Cl. .............................. 411/8; 411/14; 73/761; 116/212
(58) Field of Search .................. 411/8, 9, 10, 11, 411/14; 73/761; 116/212, DIG. 34

(56) References Cited

U.S. PATENT DOCUMENTS

| | | | |
|---|---|---|---|
| 3,060,731 | 10/1962 | Adise | 73/141 |
| 3,104,645 | 9/1963 | Harrison | 116/114 |
| 3,169,440 | 2/1965 | Taylor . | |
| 3,469,492 | 9/1969 | Dahl . | |
| 3,954,004 | 5/1976 | Orner | 73/88 F |
| 4,047,463 | 9/1977 | Coldren . | |
| 4,131,050 | 12/1978 | Holmes . | |
| 4,164,164 | 8/1979 | Trungold . | |
| 4,303,001 | 12/1981 | Trungold | 411/10 |
| 4,483,648 | 11/1984 | Trungold | 411/10 |
| 4,500,237 | 2/1985 | Pliml, Jr. | 411/11 |
| 4,773,272 | 9/1988 | Trungold | 73/761 |
| 5,199,835 | 4/1993 | Turner | 411/11 |
| 5,385,054 | 1/1995 | Kramer | 73/761 |
| 5,584,627 | 12/1996 | Ceney et al. | 411/14 |
| 5,589,640 | 12/1996 | Butler | 73/761 |
| 5,668,323 | 9/1997 | Waxman | 73/761 |
| 5,722,807 | 3/1998 | Hodge | 411/10 |
| 5,913,647 | 6/1999 | Hodge | 411/11 |

FOREIGN PATENT DOCUMENTS

380447   9/1964   (SE) .

*Primary Examiner*—Neill Wilson
(74) *Attorney, Agent, or Firm*—Libert & Associates; Victor E. Libert; Frederick A. Spaeth (57) ABSTRACT

The present invention provides several embodiments of tension-indicating fasteners that include tension indicators having indicating arms equipped with a laterally-extending contact member or a foot portion. A contact member extends in a tangential direction from the fastener head. The indicating arm is secured to the fastener and, by having laterally-distant contact points, the deflection of a substrate caused by the fastener head causes a distal end of the indicating arm to move with amplified magnitude. In still other embodiments of the invention, a fastener includes tension indicia for indicating a target degree of substrate deflection. The tension indicator may be disposed within a recess in the fastener head to allow the use of conventional tightening tools.

10 Claims, 5 Drawing Sheets

TENSION-INDICATING FASTENERS

CROSS REFERENCE TO RELATED APPLICATIONS

This application claims the benefit of U.S. provisional application Ser. No. 60/101,890, filed Sep. 25, 1998.

BACKGROUND OF THE INVENTION

This invention pertains to fastening devices and, in particular, to tension-indicating fasteners.

FIELD OF THE INVENTION

Bolts, nuts and washers are common parts of any fastening system for securing two or more metal members together, for securing a tension cable to an anchor or base metal or any of a wide variety of elements that must reliably secure two elements together under a predetermined load. Heretofore the monitoring of the clamp load force has been dependent upon sophisticated bolt load analyzers using personal computers or even personal workers who periodically "torque" a nut to ensure that it is exerting the proper clamping load. In commonly assigned U.S. Pat. No. 5,722,807, issued Mar. 3, 1998, entitled "CLAMP LOAD INDICATOR"Ser. No. 08/729,203, filed Oct. 15, 1996, there is disclosed an indicator utilizing a phenomenon generally referred to as "dishing" to monitor the clamp load of a fastener which invention permits an all mechanical indicator if desired. Moreover, the usual technique is to monitor bolt tension and elongation rather than compression of the jointed surface. Nonetheless, portions of that application are incorporated herewith when necessary to complete the description.

Co-pending application Ser. No. 09/102,408, filed Jun. 22, 1998 and entitled "FASTENER TENSION INDICATOR"describes several fasteners equipped with tension-indicator devices. The devices comprise indicator arms that are mounted to the fastener head and configured to remain in contact with the surface of the substrate in which the fastener is secured at points regularly remote from the fastener head. Differences in the degree of deflection caused by the tension of the fastener on the substrate affect the position of the indicator arms, which move in radial directions relative to the fastener. The disclosure of this pending application is hereby incorporated herein by reference as background information.

SUMMARY OF THE INVENTION

The present invention provides several embodiments of tension-indicating fasteners. Generally speaking, fasteners according to the present invention comprise a shank, a fastener head on the shank and a tension indicator on the fastener. In one embodiment of the present invention, the tension indicator is configured to have an indicating arm and a laterally-extending contact member. In use, the fastener is secured to a substrate against which the fastener head bears, and at least the contact member of the tension indicator is configured to contact the substrate surface. The contact member is connected to the indicating arm and extends therefrom in a tangential direction relative to the fastener head. The indicating arm is secured to the fastener and the contact member provides laterally-distant contact points on the substrate surface so that deflection in the substrate to which the fastener is secured causes a distal free end of the indicating arm to move with amplified magnitude.

In another embodiment of the invention, a plurality of tension indicators may be secured to the fastener head.

According to still another embodiment of the invention, the contact member is connected to the fastener at a point above the surface of the substrate and vertical movement of the fastener head (relative to the "horizontal" surface of the substrate) causes the indicating arm to move or is at least a partial component of such movement. In still other embodiments of the invention, the improved fastener comprises means for indicating a target degree of substrate deflection.

In particular embodiments, the present invention provides a fastener comprising a shank having two ends, a fastener head on one end of the shank, and a tension indicator on the fastener. The tension indicator comprises an indicating arm having two ends and being connected to the fastener head at one end and extending along the fastener head with a space therebetween and further comprising a laterally-extending contact member connected to the indicting arm above where the indicating arm is connected to the head.

According to one aspect of the invention, the indicating arm may comprise a gauge portion configured to extend over the top of the fastener head. Optionally, there may be tension indicia on the fastener head.

According to another aspect of the invention, the fastener may further comprise a second tension indicator attached to the head opposite the first tension indicator.

Optionally, the laterally-extending contact member may have an A-frame configuration.

The present invention also relates to an improved washer configured to rest on the surface of a substrate wherein the improvement comprises an indicating arm connected to the washer and configured to extend away from the surface of the substrate on which the washer may rest. Preferably, the indicating arm is configured to contact the surface of the substrate at a point distant from the washer.

An alternative embodiment of the invention relates to a fastener comprising a shank having two ends, a head at one end of the shank and a tension indicator comprising an indicating arm having two ends and being connected to the head with one end extending away from the shank and the other end extending in an opposite direction to provide a foot portion for contact with a surface of a substrate beneath the fastener head. Optionally, there may be a shim between the indicating arm and the fastener head. The foot portion may be configured to extend to within the periphery of the fastener head or outside the periphery of the fastener head.

Any of the devices described herein may optionally include a filler in the space between the indicating arm and the fastener head.

In various embodiments, the fastener may comprise an induction coil through which the tension indicator moves as the fastener is tightened onto a substrate, or a potentiometer strip wherein the tension indicator comprises a wiper in contact with the strip, or a resistor strain gauge.

The present invention further provides a fastener having a central axis and a tension indicator disposed alongside the head of the fastener and configured to move towards the central axis when the fastener is tightened to a substrate, wherein the fastener head defines a recess sized and positioned to accommodate the tension indicator in an untightened position and in a tightened position whereby a tightening tool can bear upon the fastener head to tighten the fastener without contacting the tension indicator. Optionally, the fastener head may comprise windows that open to the recess and through which the tension indicator may become visible as the fastener is tightened against a substrate.

DETAILED DESCRIPTION OF THE INVENTION AND PREFERRED EMBODIMENTS THEREOF

Figure 1A:
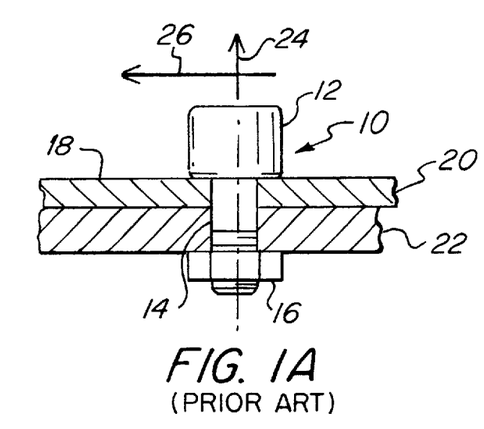
FIG. 1A is a schematic representation of a fastener lacking any tension-indicating means, in accordance with the prior art.

There is shown in FIG. 1A a schematic representation of a prior art fastener of the kind to which the present invention pertains. Fastener 10 comprises a fastener head 12, a shank 14 and an anchor 16. Head 12 defines a substrate contact surface (unnumbered) about the shank that rests on the upper surface 18 of a first substrate 20, and shank 14 passes through an aperture in substrate 20. Shank 14 also passes through a second substrate 22 to which first substrate 20 is secured by fastener 10. Fastener 10 may be a rivet, a bolt, or any similar device capable of being secured to at least one substrate as shown in FIG. 1A and being subjected to tension through shank 14 that results in the application of pressure by head 12 on the surface 18 of substrate 20; anchor 16 may be a nut, the second head of a rivet, etc. While various particular embodiments of the invention will be described herein with reference to bolt-type fasteners, it should be understood that such descriptions apply equally to all such fasteners. In addition, the tension indicators described herein can be used in relation to nuts that are used to secure bolts as well as on bolt heads. In FIG. 1A, arrow 24 indicates a direction or orientation relative to fastener 10 that may be referred to herein as "vertical" or "axial"; this is the direction generally parallel to the forces mutually applied between the fastener head 12 and surface 18 when fastener 10 is tightly secured therein. A typical fastener with the present dimension has a generally radially symmetrical configuration, e.g., it may comprise a generally cylindrical rivet shaft protruding from the center of a round rivet head or a generally cylindrical, threaded shaft extending from the center of a bolt head of regular geometric configuration, e.g., a round, square or hexagonal bolt head. Arrow 24 is illustrated as being aligned with the central axis of the fastener shaft or shank 14. Arrow 26 indicates a direction referred to herein as "radially", indicating the direction generally perpendicular to the vertical and aligned with the central axis of the fastener shaft or shank 14.

Figure 1B:
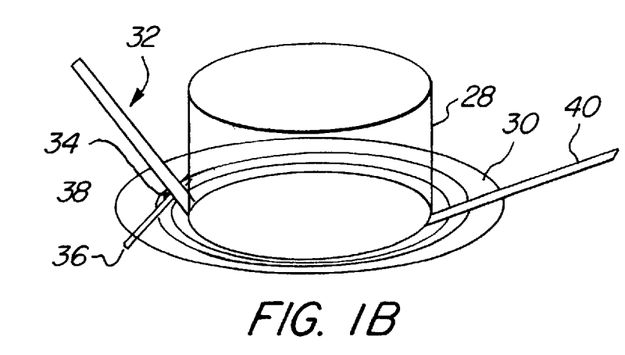
FIG. 1B is a schematic perspective view of the head of a fastener secured to a substrate and equipped with a tension indicator in accordance with a particular embodiment of the present invention and a comparative tension indicator lacking a contact member.

FIG. 1B shows the head 28 of a rivet in accordance with one embodiment of the present invention tightly secured against the substrate 30. Rivet head 28 comprises a substrate contact surface (unnumbered) that bears against substrate 30 and an exposed surface having a top portion that is parallel to the substrate contact surface and a side portion extending between the top portion and the substrate contact surface. A tension indicator 32 extends from the substrate contact surface of the fastener head in accordance with the present invention. Tension indicator 32 comprises an indicating arm 34 that has two ends and that is secured at one end to rivet head 28, and which extends from the substrate contact surface thereof. Tension indicator 32 also comprises a contact member or contact member 36 that is joined to indicating arm 34 at a fulcrum point 38 which is closer to the rivet head than to the free end.

Figure 1C:
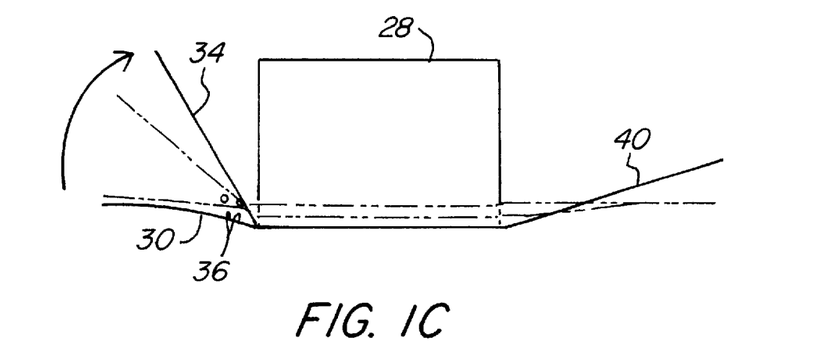
FIG. 1C is a schematic elevational view of the fastener of FIG. 1B.

The concentric circles of FIG. 1B indicate a deflection of the substrate 30 in the region immediately surrounding the rivet head caused by the force with which rivet head 28 bears on substrate 30. Contact member 36 is of sufficient length and is sufficiently close to the rivet head so that its distal ends, i.e., the ends most distant from fulcrum point 38, rest on substrate 30 at points of minimal deflection relative to the immediate vicinity of rivet head 28. As rivet head 28 is secured against substrate 30 with increasing pressure, the degree of deflection of substrate 30 immediately around rivet head 28 increases and, in relative terms, rivet head 28 appears to "sink" into the substrate relative to contact member 36. However, since contact member 36 extends to positions on substrate 30 that are minimally affected by such deflection (and less affected than the substrate surface directly beneath fulcrum point 38), contact member 36 provides a fulcrum for indicating arm 34 that is substantially vertically stationary relative to the undeflected portion of substrate 30. As a result, the increasing tension on rivet head 28 against substrate 30 draws the proximal end of indicating arm 34 and, to an extent, the portion of substrate 30 beneath fulcrum point 38, downward relative to contact member 36 (and to fulcrum point 38) and causes a lever-like action in which contact member 36 moves towards rivet head 28 generally along a radius emanating from the center of the rivet head, and the distal end of indicating arm 34 moves upwards as indicated in FIG. 1C. For comparative illustration, indicating arm 40 is secured to rivet head 28 in a manner similar to indicating arm 34, but it lacks a laterally-extending contact member. Accordingly, as indicated in FIG. 1C, the deflection in substrate 30 caused by rivet head 28 results in movement of much smaller magnitude than is seen in tension indicator 32 in accordance with the present invention since the fulcrum point (i.e., the point at which indicating arm 40 bears on substrate 30) is not vertically stationary but rather sinks with rivet head 28, thus reducing any lever-like action. In contrast to the present invention, the stress indicator shown in FIG. 1 of U.S. Pat. No. 5,913,647 comprises an arm (17) that moves in a tangential direction along the side of the fastener head.

Figure 2A:
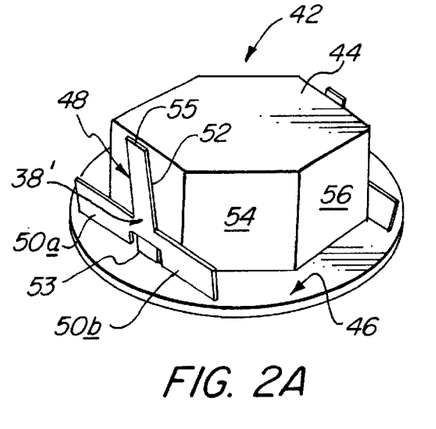
FIG. 2A is a schematic perspective view of the head of a fastener equipped with two tension indicators in accordance with another particular embodiment of the present invention.

FIG. 2A shows a fastener 42 comprising a hexagonal bolt head 44 that is bearing on a washer 46. Fastener 42 comprises a tension indicator 48 that is configured to have a laterally-extending contact member provided by lateral extensions 50a, 50b. Tension indicator 48 is secured to bolt head 44 at the proximal end 53 of the vertically-extending indicating arm 52, which extends below lateral extensions 50a, 50b to where it is. secured to the bottom of bolt head 44 by spot welding, laser welding, or any other suitable technique. Optionally, tension indicator 48 may be of laminated construction, thus allowing for a first material chosen for its ease of attachment and suitable flexure characteristics. In the illustrated embodiment, tension indicator 48 is of laminated construction, having one layer whose configuration comprises part of indicating arm 52 and which is welded at its proximal end 53 to bolt head 44 and which extends upward along the fastener head from the edge of the substrate contact surface thereof to a free end 55. The second layer of material comprising laminated tension indicator 48 is generally T-shaped, having a central portion that comprises part of indicating arm 52, and further comprises the lateral extensions 50a and 50b. Extensions 50a, 50b extend laterally from a point 38' on indicating arm 52 spaced from the substrate contact surface of bolt head 44 but closer to bolt head 44 than to the free end of indicating arm 52. As can be seen in FIG. 2A, each of lateral extensions 50a and 50b forms a flap which is spaced from indicating arm 52 and which extends downward from point 38' towards end 53 of indicating arm 52 for contact with a substrate surface. By providing such a downward-extending portion of the contact member, the fulcrum effect described above with reference to FIGS. 1B and 1C can be attained without requiring fulcrum point 38' to be as close to end 53 as a contact member that lacks a downwardly-extending portion, such as contact member 36 of FIG. 1B. In fact, the use of a suitably configured downwardly-extending portion will permit a configuration of a tension indicator having a fulcrum point that is located on the indicating arm at a point closer to the free vertical end than to the point of connection to the fastener head, as illustrated below.

It will be evident that a tightening tool, e.g., a wrench, can easily be devised to securely grasp bolt head 44 by merely engaging vertical surfaces 54, 56 and the corresponding surfaces on the opposite side of bolt head 44, thus avoiding interference with the operation of tension indicator 48.

By choosing a washer 46 of known deflection characteristics relative to bolt head 44, the motion in indicating arm 52 caused when bolt head 44 is tightened against the washer can, when measured carefully, provide a precise, quantitative indication of the tension.

Figure 2B:
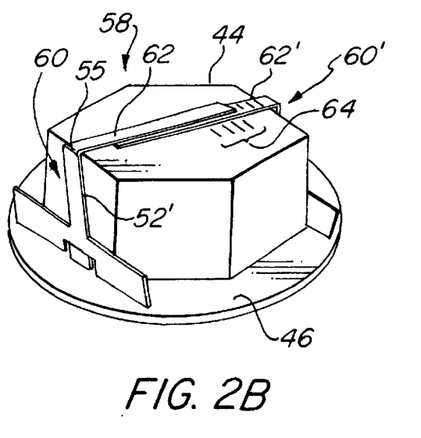
FIG. 2B is a schematic perspective view of a fastener equipped with two tension indicators according to another embodiment of the present invention.

FIG. 2B illustrates an embodiment of the invention that is similar to that of FIG. 2A. As illustrated in FIG. 2B, fastener 58 comprises a tension indicator 60 that is substantially similar in construction to tension indicator 48 of FIG. 2A, except that one of the laminated layers comprises an extended portion, referred to herein as a gauge portion 62, that extends horizontally from the free end 55 of the vertically-extending indicating arm 52' and is configured to lie against the flat horizontal surface of bolt head 44. So configured, gauge portion 62 will advance across the top surface of bolt head 44 as bolt head 44 is tightened against the surface of washer 46. Optionally, bolt head 44 may comprise, on its top surface, positioned indicia such as scale lines 64 by which changes in the orientation of indicating arm 52' can be read. Another optional feature of fastener 58 is the inclusion of a second tension indicator 60' secured to bolt head 44 on the side opposite from tension indicator 60.

Like tension indicator 60, tension indicator 60' includes a gauge portion 62'. Gauge portion 62' is disposed beneath gauge portion 62 of tension indicator 60. As bolt head 44 tightens against, and deflects, the surface of washer 46, both gauge portions 62 and 62' will move towards each other. Gauge portion 62' is equipped with indicia (not numbered) similar to scale lines 64 on which the relative movements of gauge portions 62 and 62' can be noted. Since both gauge portions are moving in the same radial direction, i.e., either toward each other as bolt head 44 is tightened or away from each other as it is released, the degree of relative motion between them will be twice that relative to the surface of bolt head 44, so the scale indicia on gauge portion 62 can be used with greater ease and accuracy than scale lines 64.

Figure 2C:
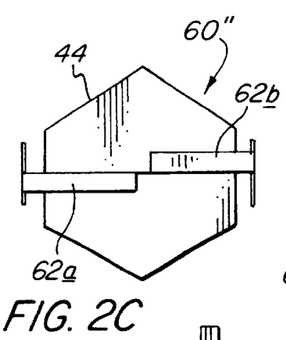
FIGS. 2C, 2D and 2E are schematic plan views of the fastener of FIG. 2B in various stages of tension.
Figure 2D:
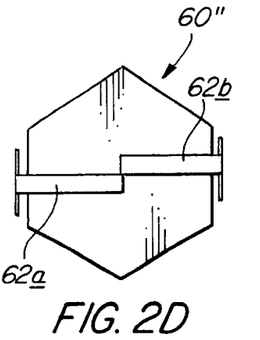
Figure 2E:
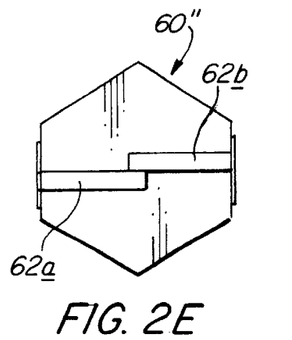

FIGS. 2C, 2D and 2E illustrate a variation of the embodiment of FIG. 2B, in which the fastener 60" is equipped with two tension indicators having diametrically opposed gauge portions 62a and 62b. FIG. 2A shows the gauge portions 62a, 62b in a "starting position", i.e., before fastener 60" is tightened against the substrate surface. In the illustrated starting position, the distal ends of the gauge portions 62a and 62b are seen to fall short of the center of bolt head 44. Tightening fastener 60" against the substrate surface causes movement of the gauge portions 62a and 62b as described above. Optionally, fastener 60" can be configured so that a predetermined desired degree of tension will produce movement resulting in the configuration shown in FIG. 2B, i.e., in which the distal ends of the gauge portions 62a and 62b align with each other. With such an embodiment, movement that causes overlap as shown in FIG. 2C indicates excessive tightening.

Figure 3:
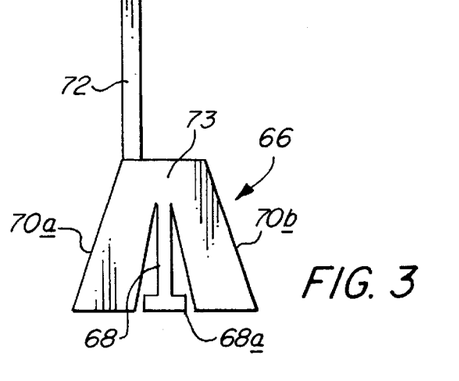
FIG. 3 is a schematic outline of a tension indicator in accordance with another embodiment of the present invention.

FIG. 3 illustrates an "A-frame" configuration for a tension indicator 66 for use on a fastener head or tightening bolt in accordance with the present invention. The tension indicator 66 comprises a central indicating arm 68 that terminates in tab 68a that is configured for convenient welding to the fastener head. Tension indicator 66 also comprises laterally- and downwardly-extending legs 70a, 70b which comprise the laterally-extending contact member and that are configured to contact the surface of a substrate against which the fastener head bears, at points laterally distant from indicating arm 68, where the degree of deflection of the substrate is substantially less than that at the point where indicating arm 68 may contact the substrate. Tension indicator 66 is an example of an embodiment of this invention in which the contact member extends both laterally and downward from the indicating arm, and thus allows their interconnection at a fulcrum point 73 at the free end of indicating arm 68. Tension indicator 66 also comprises a gauge portion 72. Gauge portion 72 may optionally be configured to coordinate with the gauge portion of a similarly configured tension indicator secured to the fastener head opposite from tension indicator 66, as suggested in FIG. 2B. However, in a particular embodiment, gauge portion 72 may comprise transparent or translucent portions while the cooperating gauge portion comprises strategically placed color indicators. When the transparent or translucent portions in gauge portion 72 display particular colors on the cooperating gauge portion, this can indicate to the user that a particular, predetermined tension has been attained.

Figure 4:
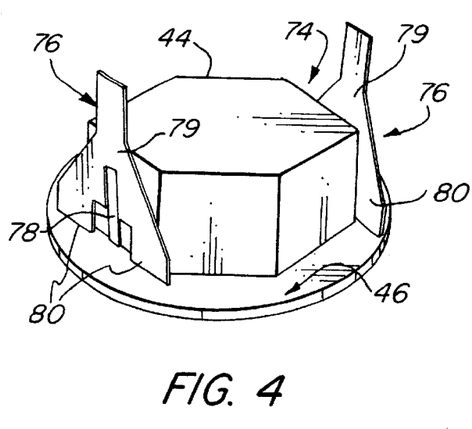
FIG. 4 is a schematic perspective view of a fastener in accordance with still another embodiment he present invention.

FIG. 4 illustrates another embodiment of a fastener in accordance with the present invention that comprises a tension indicator substantially like that illustrated in FIG. 3. Fastener 74 comprises two tension indicators 76 that correspond in overall configuration to tension indicator 66 of FIG. 3, i.e., they have a generally A-frame configuration. Tension indicators 76, however, each comprise a indicating arm 78 that is partially laminated to a separate layer 79 that provides the laterally-extending legs 80 comprising the contact member. Indicating arm 78 may comprise a thin strip of metal, e.g., 0.003 inch stainless steel, while layers 79 may comprise 0.015 inch stainless steel.

Figure 5:
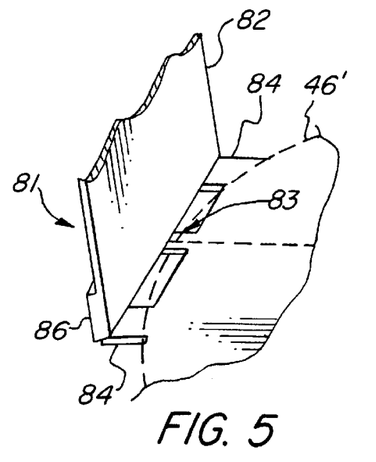
FIGS. 5 and 5A are a partial perspective and a schematic cross-sectional view of a washer comprising a tension indicator in accordance with the present invention.
Figure 5A:
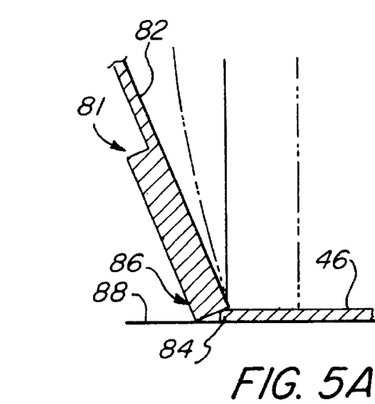

FIG. 5 illustrates several additional and/or alternative features and embodiments of the present invention. As illustrated in FIG. 5, a tension indicator 81 is connected to, e.g., formed integrally with, a washer 46'. Washer 46' may either be formed separately from the fastener, the shaft of which must then be inserted through its central aperture or, as is common with many bolt-type fasteners, may be formed integrally with the bolt head. Whichever is the case, tension indicator 81 comprises an upwardly-extending indicating arm 82 which moves due to the differences in deflection in the surface of the substrate caused about the washer 46' in the same manner as other embodiments in which the indicating arm is connected to the bolt head. Another optional and alternative feature of the present invention as illustrated in FIG. 5 is that tension indicator 81 is connected to washer 46' not only at a central point 83 but also at at least one or, as shown in FIG. 5, at a plurality of lateral connection points 84. As shown in FIG. 5, arm 82 has a generally flat configuration so that the connections to the periphery of washer 46' at points 84 are necessarily longer than the connection at central point 83. The increased length of the connecting structure and the increased distance from the center of the fastener both assure that the lateral edges of arm 82 will contact the surface at points exhibiting less deflection than will be seen at central point 83. The difference in the degrees of deflection will amplify the movement of indicating arm 82 at its distal end (not shown). Finally, FIG. 5 illustrates that an additional structure, an actuator foot 86 may optionally be secured to arm 82 for contact with the surface substrate to provide additional leverage for the movement of tension indicator 81. A schematic cross-sectional view of the embodiment of FIG. 5 is shown in FIG. 5A, showing how actuator foot 86 bears on substrate 88. Washer 46' is seen to have a substrate contact surface (unnumbered) configured for contact with a substrate 88, as shown in FIG. 5A. The arm 82 extends at an angle relative to the substrate contact surface (i.e., it is not parallel thereto).

Figure 5B:
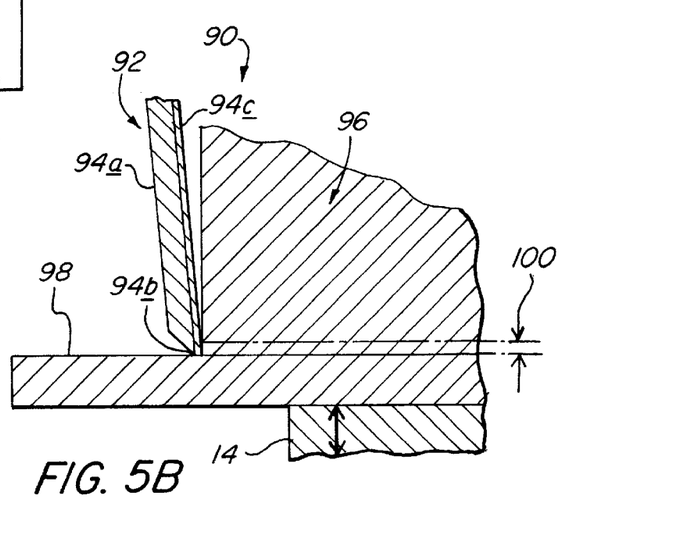
FIG. 5B is a schematic cross-sectional view of a fastener head of yet another embodiment of the present invention on a substrate.

FIG. 5B illustrates a fastener 90 in accordance with yet another embodiment of the present invention in which the tension indicator 92 comprises a vertically-extending indicating arm 94a which is secured to the fastener head 96 at a fulcrum point that is distant from the surface of substrate 98 against which fastener 90 will bear. Accordingly, indicating arm 94a of tension indicator 92 must include a foot portion 94b that extends vertically downward across gap 100 in order to make contact with substrate 98. The gap 100 may be provided by an undercut at the bottom of the fastener head 96 or by a washer whose outer diameter is smaller than the periphery of the fastener head. Indicating arm 94a extends from foot portion 94b upward to a free end (not shown). Indicating arm 94a is preferably configured so that it contacts substrate 98 at a point that is not vertically beneath the point of contact with fastener head 96, i.e., that provides a vertical off-set. Since indicating arm 94a is secured to the periphery of fastener head 96, the offset can be achieved by configuring foot portion 94b to contact the substrate at a point either within the periphery of head 96 or outside of it. The contact of foot portion 94b on substrate 98 will then produce a moment in indicating arm 94a which can pivot slightly about the contact point of indicating arm 94a on fastener head 96. The illustrated embodiment shows that indicating arm 94a is a laminated structure comprising a distancing shim 94c that does not reach to substrate 98. The thickness of shim 94c helps to dispose the end of foot portion 94b beyond the periphery of fastener head 96. Accordingly, when foot portion 94b bears against substrate 98, the remaining upper portion of arm 94a will pivot from the configuration shown in FIG. 5B towards fastener head 96. If a horizontal gauge portion (not shown) extends from the free end of vertical arm 94a, it will cross the surface of fastener head 96 in a manner similar to that shown in FIGS. 2C, 2D and 2E as fastener 90 is tightened. In an alternative embodiment, foot portion 94b may be inclined to contact substrate 98 beneath the overhang of fastener head 96 over gap 100, i.e., within the periphery of head 96. In such case, tightening of the fastener will cause the remaining upper portion of arm 94a to move away from the fastener head. In either case, as fastener 90 is tightened by tension on shaft 14, head 96 and the tension indicator 92 secured thereto will move downward as gap 100 shrinks. This causes the foot portion 94b of arm 94a to bear against substrate 98 and results in detectable movement at the free end of indicating arm 94a.

As indicated above, it will be well within the ability of one of ordinary skill in the art, given the present disclosure, to choose or design a tightening tool that will not interfere with the tension indicators described herein, e.g., to design a suitably modified wrench that need only engage sides of a bolt not equipped with a tension indicator in accordance with the present invention. In addition, existing tools such as an open-mouthed wrench or pliers can be used. The present invention can be adapted, however, to facilitate or possibly eliminate the need to avoid contact with the sides of the fastener head, by providing a recess in the fastener head so that the tension indicator can be disposed within the recess. A conventional tightening tool such as a box wrench may then bear against any side of the fastener head face without interfering with the tension indicator.

Figure 6A:
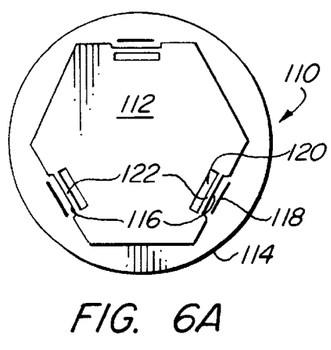
FIGS. 6A, 6B and 6C are schematic plan views of a device in accordance with still another embodiment of the present invention.
Figure 6B:
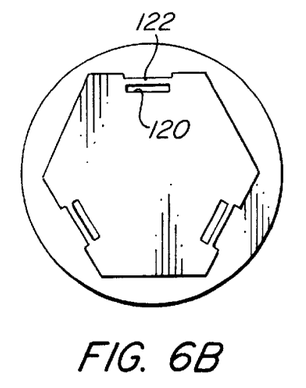
Figures 6C, 7A, 7B:
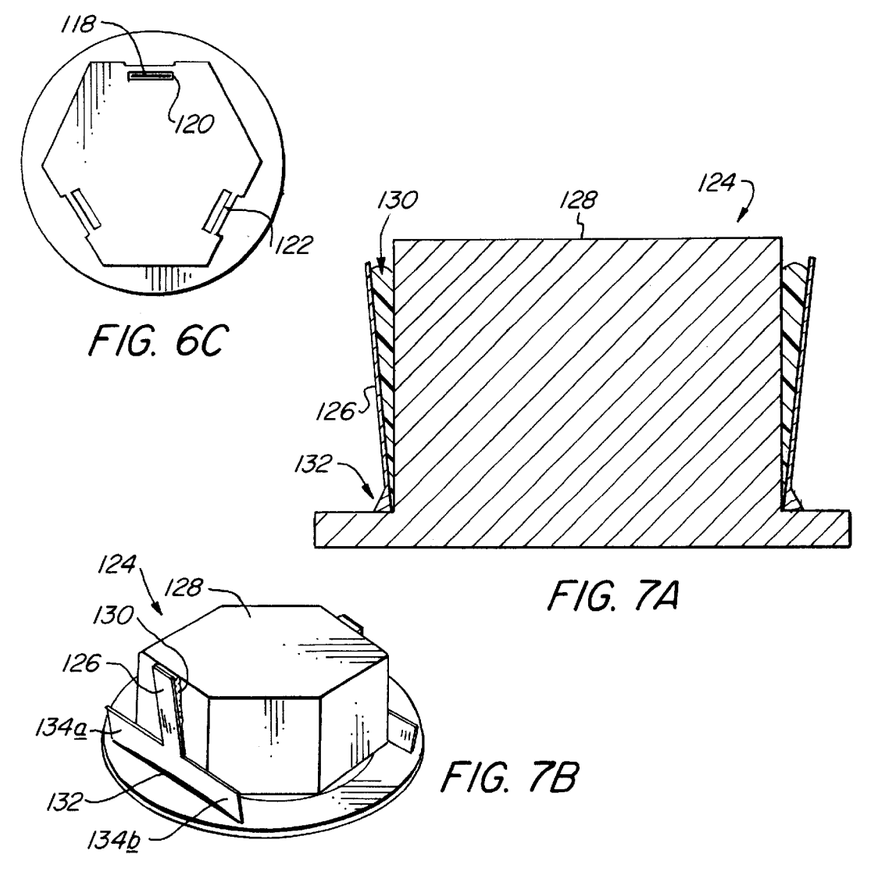
FIGS. 7A and 7B are cross-sectional and perspective views of a fastener of the present invention for including a filler between the indicating arm and the fastener head.

For example, as shown in FIG. 6A, a fastener 110 comprises a bolt head 112 having a washer 114 formed integrally therewith. Bolt head 112 defines vertically-oriented recesses 116 within which vertically-extending indicating arms 118 of tension indicators are disposed. FIG. 6A shows fastener 110 in the starting position, i.e., prior to the application of any significant tightening force. It can be seen that at least the upper portions of all six sides of bolt head 112 may be engaged by any conventional tightening tool, e.g., a box wrench (i.e., a wrench having a generally circular gripping region on the end of a handle with a gnarled interior for gripping the points of a hexagonal nut). The tension indicators are configured so that as tension is applied to the fastener, the indicating arms 118 move inwardly, toward the center axis of the fastener. Recesses 116 are configured to provide for such motion, at least to the point where the desired degree of tension is attained. Optionally, the top of bolt head 112 may define windows 120 separated from the periphery of the bolt head by bands 122. As the fastener is tightened, indicating arms 118 move inwardly toward the center of the fastener, first "disappearing" under bands 122 as seen in FIG. 7B and then reappearing within windows 120. In accordance with one embodiment of the present invention, recesses in the fastener head can be combined with tension indicia. For example, the device may be configured so that either the disappearance of indicating arms 118 under bands 122 or the reappearance of indicating arms 118 in windows 120 indicates the desired degree of tightening tension. The "disappearing" signal of proper tension may be preferred if it is desired to use the "reappearance" as indicia of over-tightening. Having a plurality of tension indicators with separate tension indicia in a given fastener allows the user to compare the indicated tension from one tension indicator to another. If a situation occurs as illustrated in FIG. 6C, in which two of the indicating arms 118 are "hidden" beneath bands 122 but in which a third is visible through a window 120, this would indicate that the fastener is not evenly tensioned against the substrate surface.

To prevent interference of the tension indicator function of the fastening devices in accordance with the present invention, it will be useful to fill gaps between the indicating arms and the fastener head with materials that will prevent the introduction of interfering materials such as dirt or other debris. As illustrated in FIGS. 7A and 7B, a fastener 124 comprising a tension indicator in accordance with the present invention comprises a central, vertically-extending indicating arm 126 secured to the fastener head 128. (To simplify the drawing, the laterally-extending portion of the tension indicator is not shown.) Arm 126 is connected to fastener head 128 at its proximal end, but extends upwardly and away from head 128, leaving a space between into which dirt or other interfering matter may fall. Accordingly, the illustrated embodiment provides a filler 130 such as a closed-cell elastomer to prevent the introduction of such interfering matter. The effect of the presence of filler 130 on the movement of arm 126 may be evaluated before using fastener 124 so that the utility of the tension indicator is not lost. In addition to filler 130, a sealer 132, e.g., a bead of silicone or other synthetic polymeric material, may be disposed along the interface between the laterally-extending portions 134a, 134b of the contact member and the substrate surface, as indicated in FIG. 7B.

The foregoing embodiments illustrate that by providing the vertically-extending indicating arm with a laterally-extending contact member, movement of the indicating arm is accentuated. The contact member extends tangentially from the point of contact of the indicating arm and therefore provides contact with portions of the substrate surface that exhibit less deflection than those where the indicating arm is secured to the fastener head. By having two laterally-extending portions extending in opposite directions, a balancing effect is achieved, thus minimizing the effect of any localized surface irregularities in the substrate surface and improving the accuracy of the tension indicia.

Figure 8:
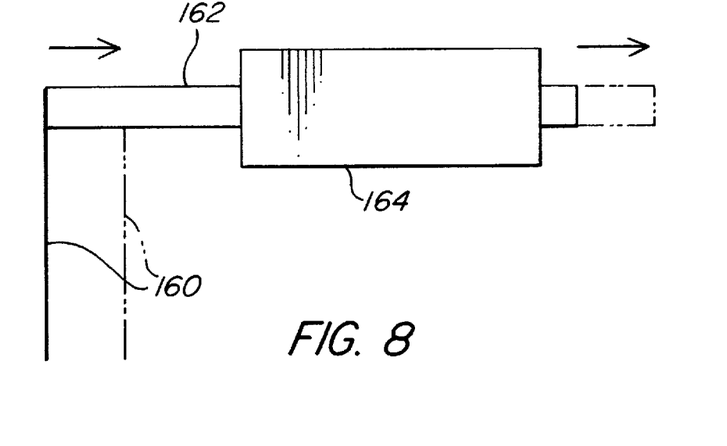
FIGS. 8, 9 and 10 are schematic views of various embodiments of indicating arms suited for electronic or otherwise mechanized tension observation.
Figure 9:
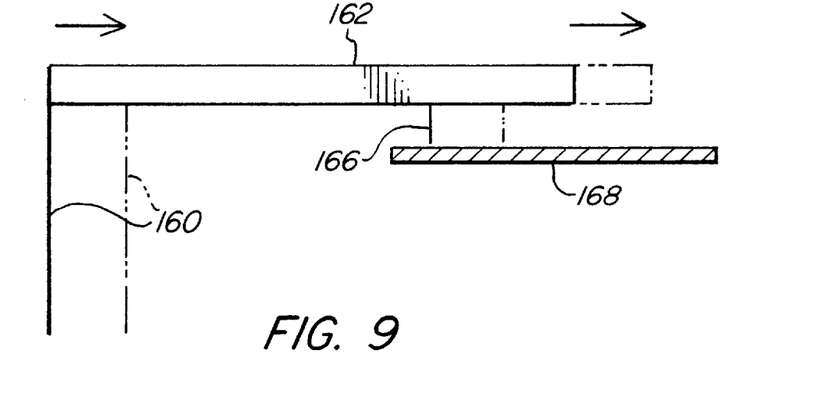
Figure 10:
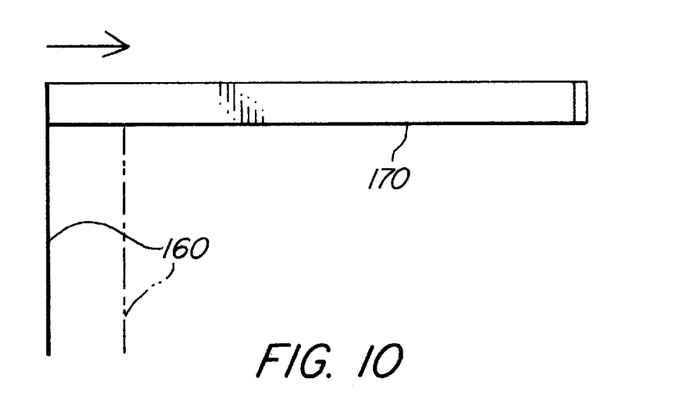

The previously-described embodiments have referred to visually discernible tension measurements and other indicia. However, it should be understood that automated or mechanized tension readings can easily be made from the present invention. For example, the vertically-extending indicating arm 160 or a gauge portion 162 thereon could be designed as a choke that passes through an induction coil 164 as suggested in FIG. 8; or it may be dimensioned and configured to pass a wiper 166 across a potentiometer strip 168, as suggested in FIG. 9. The potentiometer strip would be connected to a suitable output device to indicate changes in tension and to calibrate the tightness of the device. In a related embodiment, the gauge portion may comprise a resistor strain gauge 170 as suggested in FIG. 10.

What is claimed is:

1. A fastener comprising:
   a shank having two ends;
   a head at one end of the shank;
   a tension indicator comprising an indicating arm having two ends and being connected to the head with one end extending away from the shank and the other end extending in an opposite direction to provide a foot portion for contact with a surface of a substrate beneath the fastener head.

2. The fastener of claim 1 comprising a shim between the indicating arm and the fastener head.

3. The fastener of claim 1 or claim 2 wherein the foot portion is configured to extend to within the periphery of the fastener head.

4. The fastener of claim 1 or claim 2 wherein the foot portion is configured to extend to beyond the periphery of the fastener head.

5. The fastener of claim 1 comprising a reversibly compressible filler in the space between the indicating arm and the fastener head.

6. The fastener of claim 1 comprising an induction coil through which the tension indicator moves as the fastener is tightened onto a substrate.

7. The fastener of claim 1 comprising a potentiometer strip and wherein the tension indicator comprises a wiper in contact with the strip.

8. The fastener of claim 1 wherein the tension indicator comprises a resistor strain gauge.

9. In a fastener having a fastener head, a central axis and a tension indicator disposed alongside the fastener head configured to move towards the central axis when the fastener is tightened to a substrate, the improvement comprising that the fastener head defines a recess sized and positioned to accommodate the tension indicator in an untightened position and in a tightened position whereby a tightening tool can bear upon the sides of the fastener head to tighten the fastener without contacting the tension indicator.

10. The fastener of claim 9 wherein the fastener head comprises windows that open to the recess and through which the tension indicator may become visible as the fastener is tightened against a substrate.

* * * * *